Oct. 2, 1951 J. P. HILL 2,569,856
APPARATUS FOR MAKING TUBING
Filed Nov. 23, 1946 5 Sheets-Sheet 1
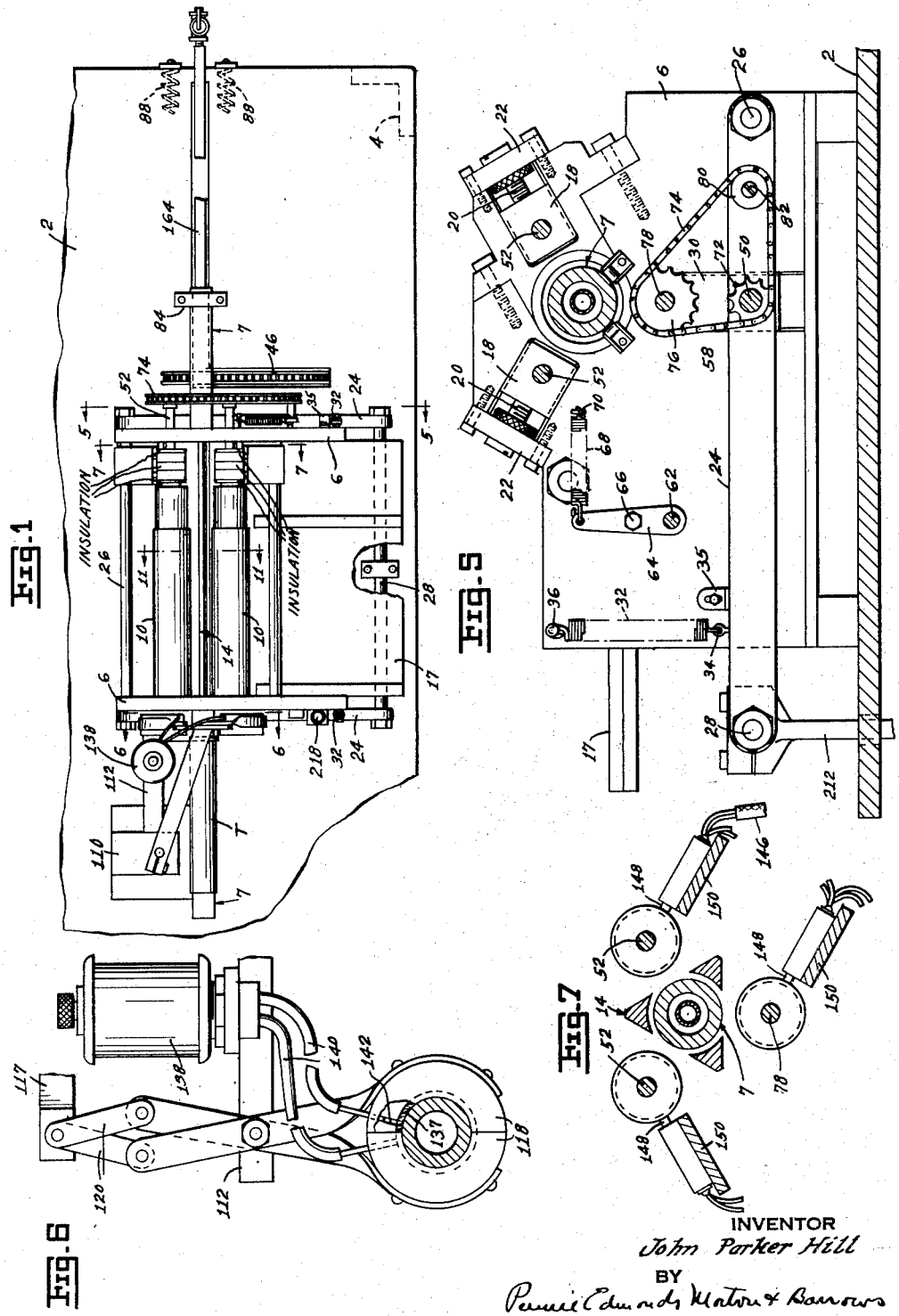
INVENTOR
John Parker Hill
BY
Pennie Edmonds Morton & Barrows
ATTORNEYS Oct. 2, 1951         J. P. HILL                    2,569,856
            APPARATUS FOR MAKING TUBING
Filed Nov. 23, 1946                          5 Sheets-Sheet 2
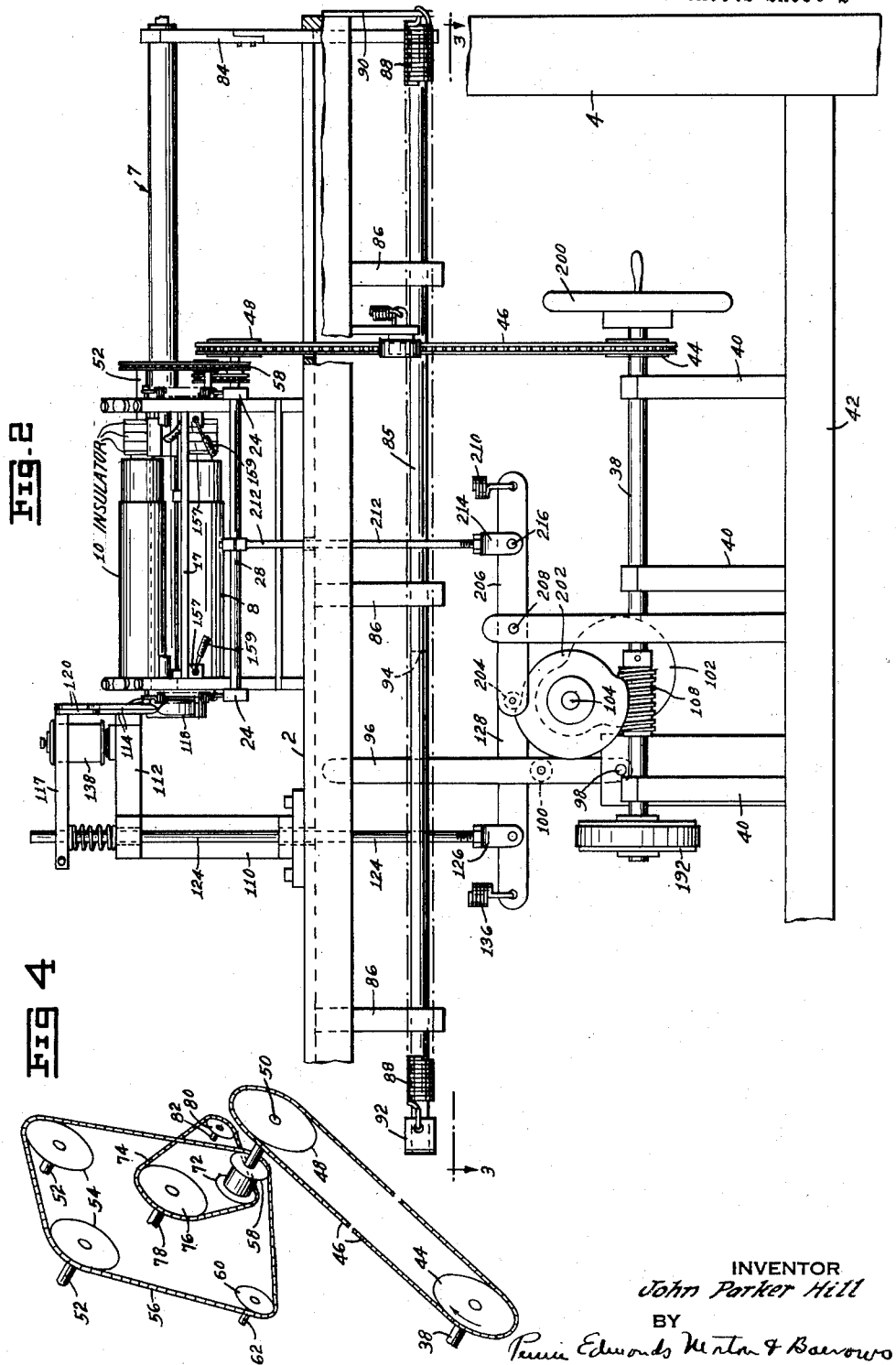
INVENTOR
John Parker Hill
BY
Pennie Edmonds Morton & Barrows
ATTORNEYS Oct. 2, 1951  J. P. HILL  2,569,856
APPARATUS FOR MAKING TUBING
Filed Nov. 23, 1946  5 Sheets-Sheet 3
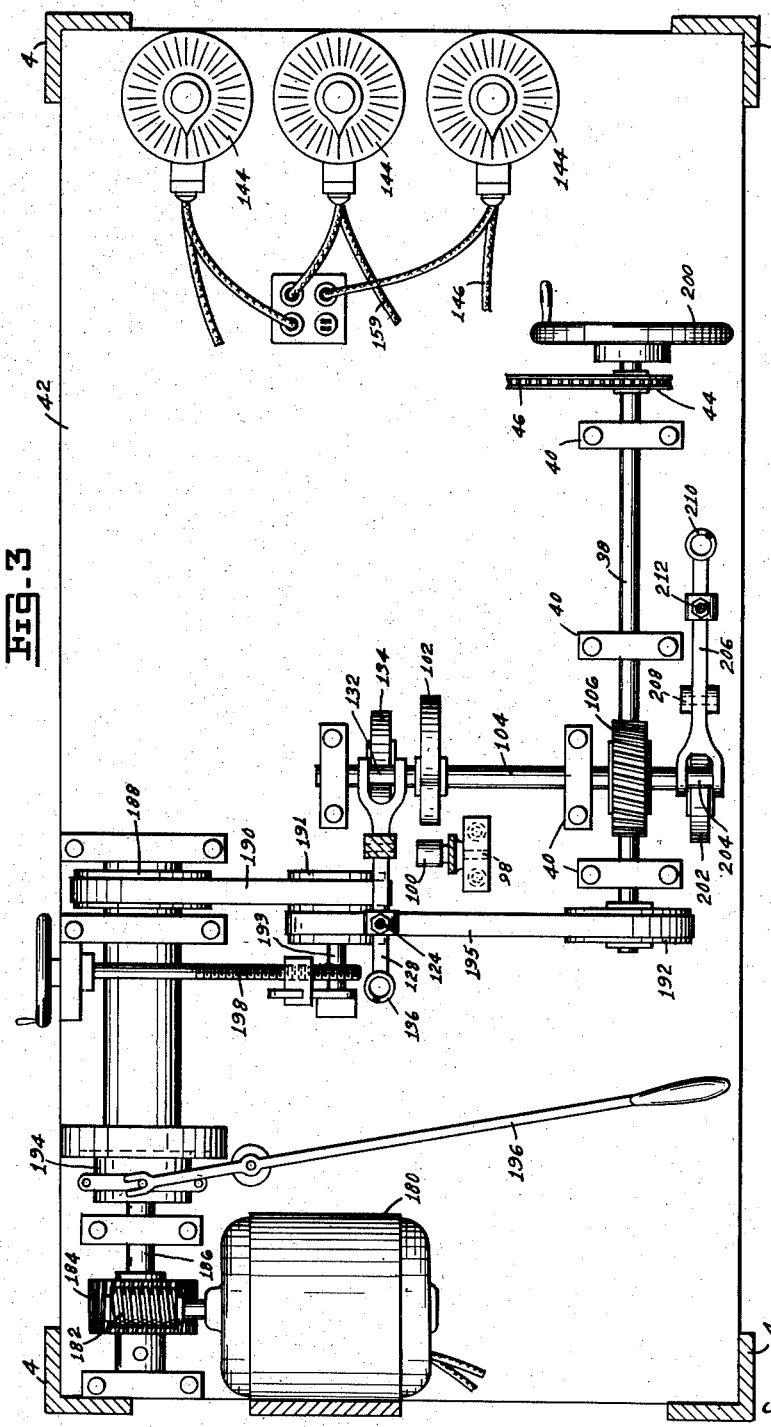
INVENTOR
John Parker Hill
BY
Pennie Edmonds Morton & Barrows
ATTORNEYS

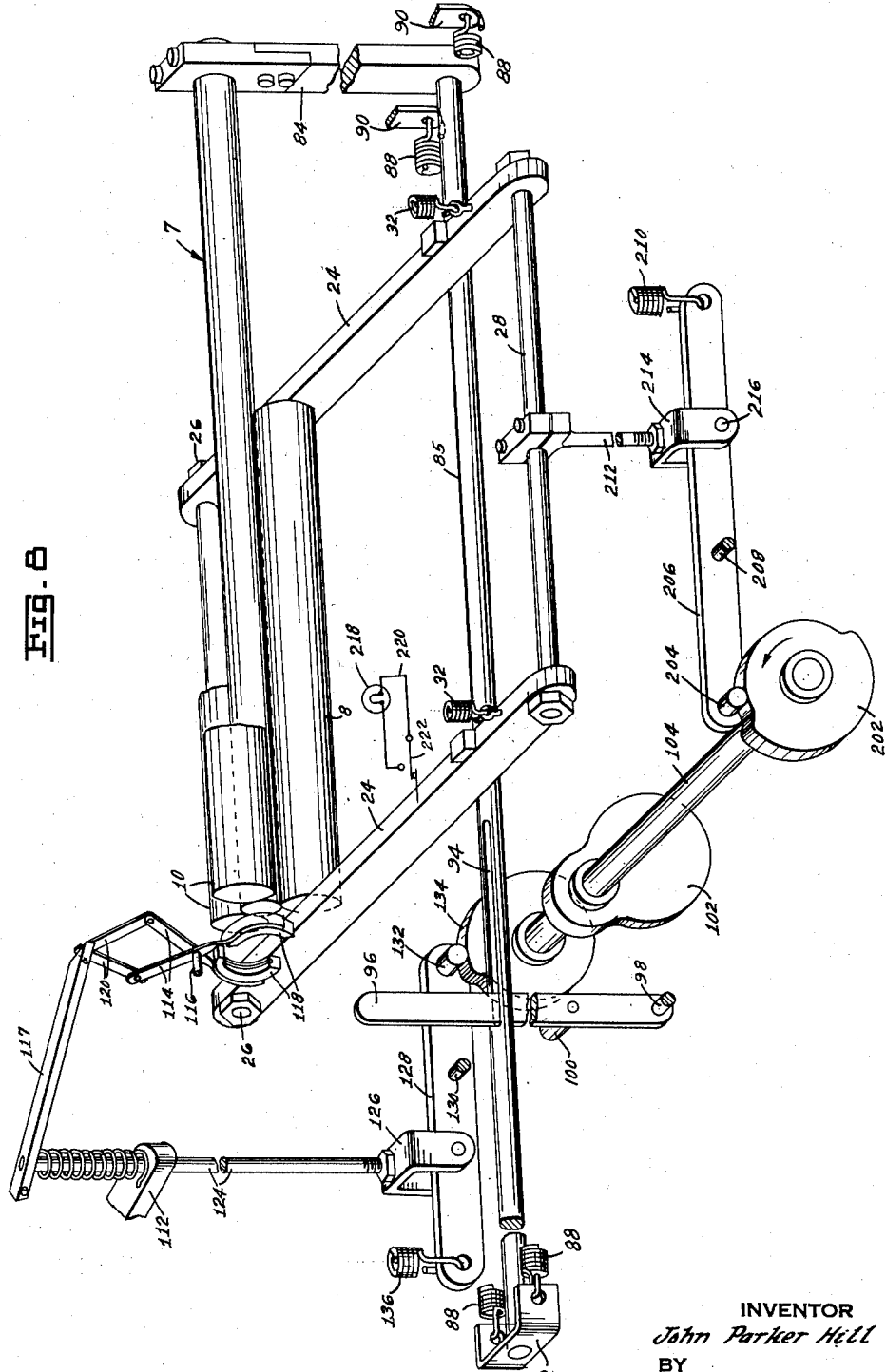

Oct. 2, 1951  J. P. HILL  2,569,856
APPARATUS FOR MAKING TUBING
Filed Nov. 23, 1946  5 Sheets-Sheet 5
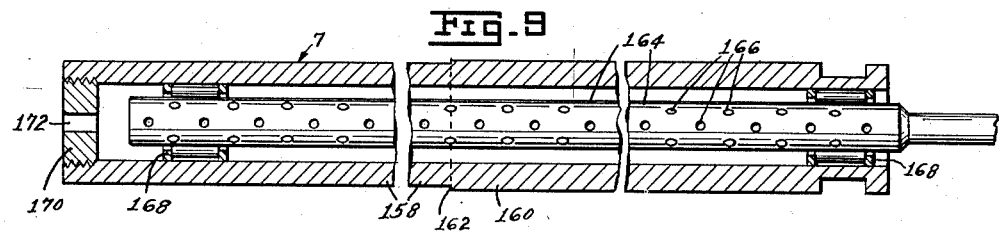
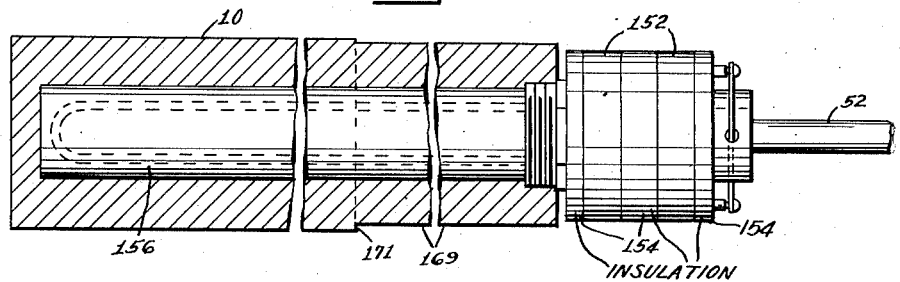
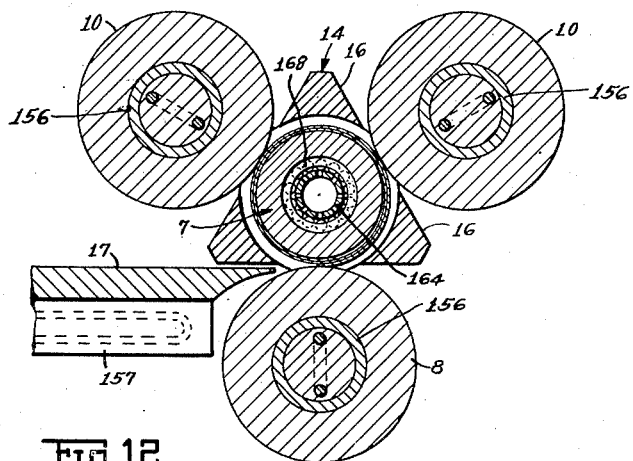
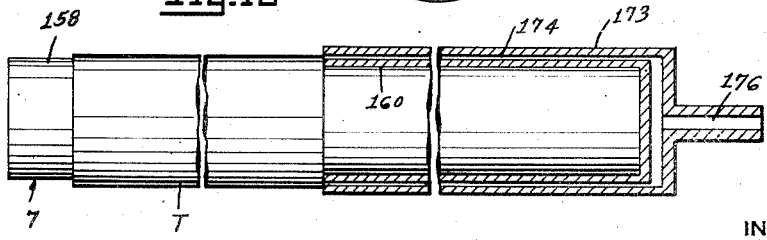
INVENTOR
John Parker Hill
BY
Pennie Edmonds Morton & Barrows
ATTORNEYS Patented Oct. 2, 1951

2,569,856

UNITED STATES PATENT OFFICE 2,569,856

APPARATUS FOR MAKING TUBING

John Parker Hill, North Plainfield, N. J., assignor to ATF Incorporated, Elizabeth, N. J., a corporation of New Jersey Application November 23, 1946, Serial No. 712,027

5 Claims. (Cl. 93—81)

This invention relates to the manufacture of tubing from sheet material and more particularly to the formation of tubes from sheets of thermoplastic material, or non-thermoplastic materials, such as metal foil, coated or otherwise treated with a thermoplastic or heat sealing material.

In carrying out the invention, I provide a mandrel to which the sheets of material are fed and on which they are wound and I provide a series of rollers in contact with the mandrel to wind the sheet material. I also provide means for guiding the material around the mandrel and heating means to raise the temperature of thermoplastic material to a temperature at which the layers of the sheet will be bonded to each other to form a tube on the mandrel.

It has heretofore been proposed to form tubing by winding sheet material on a mandrel in contact with a plurality of rollers but such proposal required the removal of the mandrel from the apparatus after each tube was wound to remove the tube from the mandrel. To overcome this objection I provide means for moving the mandrel axially after the tube has been wound. Thus, with the tube formed on the mandrel, the mandrel is moved until the portion on which the tube is wound is out of the area in which the guide and rollers are located and the tube is then removed by suitable means. The mandrel is then returned to its initial position and another sheet of material fed by the guide means to be wound on the mandrel.

The invention comprises an organization of apparatus elements whereby the mandrel is rotated during the winding of the tube by its engagement with the driven rollers, then reciprocated or moved axially out of the area of the guide and rollers and means for removing the tube from the mandrel.

In a modification of the invention I provide a mandrel, the associated rollers and guide and remove the tubes from the mandrel by means of an air blast.

In the accompanying drawings I have shown several forms of the invention. In this showing:

Fig. 1 is a partial plan view;

Fig. 2 is a partial front elevation;

Fig. 3 is a horizontal, sectional view on line 3—3 of Fig. 2;

Fig. 4 is a diagrammatic view of the drive of the rollers;

Fig. 5 is a vertical, sectional view on line 5—5 of Fig. 1;

Fig. 6 is a vertical, sectional view on line 6—6 of Fig. 1;

Fig. 7 is a vertical, sectional view on line 7—7 of Fig. 1;

Fig. 8 is a diagrammatic view of the drive mechanism;

Fig. 9 is a longitudinal, sectional view of the mandrel;

Fig. 10 is a similar view of one of the rollers;

Fig. 11 is a vertical, transverse, sectional view on line 11—11 of Fig. 1; and

Fig. 12 is a detailed view of a modified form of mandrel.

Referring to the drawings the machine comprises a bed or table 2 mounted on suitable legs 4 or other support. Above the table I provide a pair of side frames 6 which support the rollers, the mandrel and the guide. The arrangement of the mandrel, rollers and guide with respect to each other is shown in detail in Fig. 11 of the drawings. As shown, a mandrel 7 is arranged parallel to and in axial alignment with a lower roll 8 and upper rolls 10, the rolls contacting with the surface of the mandrel. The guide 14 consists of a number of similar sections, one of which is arranged adjacent the mandrel between each pair of rolls. As shown, the inner surface 16 of the guide is slightly spaced from and parallel to the surface of the mandrel. Thus as the tube is being wound, the sheet material passes between the guide and the mandrel, being wound on the surface of the mandrel. The sheet material is fed from a platform 17 which is arranged in the plane of the bottom of the mandrel and supported above the table 2 by the side frame (see Fig. 2).

The upper rolls 10 are mounted in suitable bearings 18 in the side frames 6 and these bearings are adjustable to permit use of different sized mandrels in forming tubes of different diameters. As shown, the side frames are recessed to receive the bearing blocks 18. The bearing blocks are carried by threaded bolts 20 which pass through plates 22 to permit adjustment of the bearings.

The lower roll 8 is mounted in slidable bearings 30 carried by the side frames. These bearings are movable to permit movement of the lower roll away from the mandrel when the mandrel is to be moved axially. As shown (see Figs. 5 and 8) a pair of arms 24 are pivoted on the side frames at 26 and are connected to each other at the front of the machine by a rod 28. Intermediate their ends the arms 24 carry shaft 50 which extends through bearings 30. The parts are normally held in operative position by springs 32 having their lower ends 34 connected to arms 24 and having their upper ends 36 connected to pins or bolts carried by the side frames 6. Upward movement of arms 24 is limited by stops 35 carried by the side frames.

The rollers are driven from a shaft 38 which is supported in bearings 40 mounted on a bracket or sub-bed 42. This shaft carries a sprocket 44 (see Fig. 4) and a chain 46 passes over this sprocket. The chain also passes over a sprocket 48 on the shaft 50. The ends of the upper rollers are reduced in diameter, as indicated at 52, and extend beyond the side frame as shown in Figs. 1 and 2. Sprockets 54 are mounted on these portions of the upper rollers and receive a chain 56 which passes over sprocket 58 on the shaft 50 to drive the upper rolls. A tension disc 60 carried by a shaft 62 also receives the chain 56. This shaft is carried by an arm 64 which is pivotally mounted on the side frame at 66 (see Fig. 5). Beyond the pivot the arm is connected to a spring 68, the other end of the spring being anchored on the side frame at 70. The chain 56 is thus held at the proper tightness by the spring 68.

Shaft 50 also carries a sprocket 72. This sprocket receives a chain 74 which passes over a sprocket 76 on the reduced end 78 of the lower roller. This chain also passes over a tension disc 80 mounted on a shaft 82 carried by the arm 24.

Fig. 2 of the drawings shows the mandrel 7 in position at the beginning of a cycle and Fig. 1 of the drawings shows the mandrel in its projected position for withdrawal of a tube. Because that portion of the mandrel which is between the side frames at the beginning of a cycle, as shown in Fig. 2, must be projected slightly more than a tube length for removal of the tube, the mandrel is of greater length than the rollers.

Referring to Fig. 8, the end of the mandrel is rotatably mounted in an arm 84 and where the mandrel passes through the side frames, suitable supporting rollers may be provided to permit the mandrel to rotate when in contact with the rolls, the mandrel being driven from the rolls by friction. The arm 84 is carried by a rod or shaft 85 which extends beneath the bed of the machine and is reciprocated transversely of the machine to move the mandrel. This rod is supported in bearings or brackets 86 depending from the lower side of the bed of the machine. Rod 85 and the mandrel are normally urged to the position shown in Fig. 2 of the drawings by a pair of springs 88. One end of each of these springs is connected to a bracket 90 depending from the bed of the machine and the other end is connected to a bracket or clip 92 carried by the rod 85. The rod is provided with an elongated slot 94 to receive an actuating lever 96. This lever is pivoted on the machine at 98 and carries a roller 100 intermediate its ends. This lever is adapted to be engaged by a cam 102 mounted on a cam shaft 104. Shaft 104 is provided with a worm gear 106 meshing with a worm 108 on the drive shaft 38.

The tube removing or ejecting device is also actuated from the cam shaft 104. As shown (see Fig. 2) bracket 110 is mounted on the bed or table beyond the side frame to the left of the machine and carries an arm 112. A pair of arms 114 are pivoted on the arm 112 at 116 (see Fig. 8) and beyond the pivot these arms carry substantially semi-circular members 118. The ends of the arms 114 are connected to links 120 forming a toggle construction. The other ends of these links are connected to an arm 117 and this arm is mounted on a rod 124. The rod 124 extends beneath the table and is provided with a bracket or clip 126 which straddles and is secured to a lever 128. The lever 128 is pivotally mounted at 130 and is provided with a cam follower 132 engaging a second cam 134 on cam shaft 104. A coil spring 136 is connected to the lever 128 and to the frame of the machine to normally retain the cam follower 32 in engagement with the cam. When the end of the lever carrying the cam follower 132 rides off the high point of the cam, spring 136 raises the left end of lever 128 (see Fig. 8), raising arm 117 and links 120 causing the semi-circular members 118 to move from the open position shown in Fig. 8 to the closed position shown in Fig. 6. At that time the mandrel is in the projected position shown in Fig. 1 of the drawings and the semi-circular members surround the mandrel at a point adjacent the end of tube T (see Fig. 1). As the mandrel returns to its initial position, the tube is held, permitting the mandrel to be withdrawn from the tube which falls on the table 2. The inner faces of the semi-circular members 118 are provided with a covering of fabric or the like 137 and these surfaces are lubricated from a container 138 having conduits 140 communicating with openings 142 in the semi-circular gripping members.

The frame of the machine, the rollers and the mandrel are heated by controlled heat to raise the material from which the tube is made to the desired temperature to cause bonding of the thermoplastic material. The temperatures employed will vary with different materials and in some instances it will be found advisable to have one of the three at a higher temperature whereas in other instances it will be found desirable to have another of the three at a higher or lower temperature. Separate controls 144 are therefore provided for the heating elements (see Fig. 3). As shown in Figs. 7 and 10 of the drawings, current may be conveyed to the rollers by leads 146 connected to carbon piles or brushes 148 mounted on suitable supports 150. These piles may in turn engage conducting rings 152 on the rollers separated from each other and from the body of the rolls by insulating rings 154. The rings 152 are in turn connected to a conventional heating element 156 arranged inside the roller.

Heating units 157 may be arranged beneath the platform 17 (see Figs. 2 and 11) and connected to one of the controls 144 by leads 159. Suitable heating means (not shown) may be provided for the mandrel and connected to the other control 144 by suitable leads.

The mandrel may also be provided with cooling means. In Fig. 9 of the drawings the reference numeral 158 indicates the portion of the mandrel on which the tube is wound and as shown it is of smaller diameter than the portion 160 providing a shoulder 162. The interior of the mandrel may be hollow to receive an air pipe 164, this air pipe being provided with a plurality of openings 166 for the escape of cooling air. The mandrel may be supported from the pipe by needle bearings 168. The end of the mandrel may be closed by a plug 170 having an opening 172 therein for the escape of air. As shown in Fig. 10, the rollers are reduced in diameter as at 169 adjacent their ends forming shoulders 171 which engage shoulder 162 on the mandrel.

In the form of the invention shown in Fig. 12 of the drawings, the mandrel is not moved axially but the tube is removed from the mandrel by an air blast. In this form a tube 173 extends over the end of the mandrel forming an air passage 174 through which a blast of air is delivered against the end of the formed tube when it is to be removed from the mandrel. This passage communicates with an air inlet 176.

Drive shaft 38 is driven from motor 180. The motor shaft carries a worm 182 meshing with a gear 184 on a shaft 186. This shaft is in turn provided with a pulley 188 to receive a belt 190 passing over a pulley 191 on the shaft 193 of speed regulating mechanism. Pulley 191 also receives a belt 195 passing over a pulley 192 on shaft 38. A conventional clutch of any type may be arranged on shaft 186 as indicated at 194 and this clutch may be controlled by a clutch lever 196 extending to the front of the machine. A conventional speed control mechanism 198 regulates shaft 193 to alternately loosen or tighten belts 190 and 195 and pulley 191 to control the speed of the machine.

Cam shaft 104 carries a third cam 202 which is engaged by a follower 204 carried by a lever 206. The lever 206 is pivoted on the machine at 208. The end of the lever opposite the cam follower is connected to a spring 210, the other end of which is connected to the frame of the machine to normally depress the end of the lever with the cam follower. A rod 212 is connected to the rod 28 at the front of the sub-frame and carries a clip 214 which straddles the lever 206 and is secured thereto as indicated at 216.

In operation, with the parts in the position shown in Fig. 2 of the drawings and the mandrel in what might be termed in normal position, the rollers are being rotated by the drive mechanism heretofore described, the operator feeds the sheet material from which the tube is to be made over the platform 17 beneath the front lower guide 16. As the material comes in contact with the bottom roller, it is forced around the mandrel and each of the rollers in turn guide it around the mandrel until the sheet is entirely wrapped around the mandrel in tubular form. The thermoplastic material, of which the sheet is made or with which it is coated, becomes heated, bonding the several layers together. In one particular form of tube which I have made, I have used a metal foil coated with a thermoplastic resin and the tube has been made of two layers of this material. The blanks are therefore of one dimension equal to the length of the tube and of a second dimension equal to twice its circumference. After the tube has been wound on the mandrel and before the mandrel is projected from the position shown in Fig. 2 of the drawings to the position shown in Fig. 1 of the drawings, the arms 24 are lowered to bring the lower roll out of contact with the mandrel and facilitate the axial movement of the mandrel. Cam 202 raises the cam follower 204 on arm 206. As rod 212 is connected to the arm 206 beyond the pivot, it is lowered, thus swinging the arms about their pivots, causing shaft 50 to move bearings 30 and the lower roller downwardly.

Just after that movement occurs, cam 102 engages cam follower 100, swinging lever 96 in a counter-clockwise direction in Fig. 8 of the drawings and thus moving rod 85 to the left. This moves the mandrel to the left, bringing the tube into the position shown in Fig. 1 of the drawings beyond the side frame 6. Cam follower 132 rides off the high point of cam 134, permitting spring 136 to raise left end of lever 128 and rod 124 and causing the ejecting means to assume the position shown in Fig. 6. Then when cam 102 moves away from the follower 100, springs 88 return the mandrel to its initial position. As it returns, the ejecting members 118 snugly surrounding the mandrel beyond the end of the tube, prevent the tube from moving backwardly on the mandrel and the tube is pushed off the end of the mandrel.

A lamp 218 may be connected in circuit 220, having a switch 222, the movable element of which is carried by one of the arms 24. When switch 222 is closed by upward movement of arm 24, the lamp is lighted to signal the operator that the machine is in position to receive another sheet to be wound into a tube.

I claim:

1. Apparatus of the character described comprising a pair of side frames, a mandrel passing through the side frames and capable of axial movement, a pair of upper rollers journalled in the side frames and contacting the surface of the mandrel at spaced points, a pivotally mounted frame, a lower roller journalled in the pivotally mounted frame, means for rotating the rollers, means for lowering the pivotally mounted frame, means for moving the mandrel axially while the lower roller is out of contact with the mandrel, a pair of gripping members arranged adjacent the mandrel, and means for bringing the gripping members into operative position in contact with the mandrel as the mandrel is returned to its initial position.

2. Apparatus for making tubes from sheet material comprising a mandrel, a plurality of rollers contacting the mandrel at spaced points around its circumference, the mandrel being of greater length than the rollers, means for moving the mandrel axially to bring the portion on which a tube is wound into a position beyond the rollers, a pair of gripping members arranged adjacent the mandrel, and means for bringing the gripping members into operative position in contact with the mandrel as the mandrel is returned to its initial position.

3. Apparatus for making tubes from sheet material comprising a mandrel, a plurality of rollers contacting the mandrel at spaced points around its circumference, a guide adjacent the mandrel between each pair of rollers, means for moving the mandrel axially to bring the portion on which a tube is wound into a position beyond the rollers, a pair of gripping members arranged adjacent the mandrel, and means for bringing the gripping members into operative position in contact with the mandrel as the mandrel is returned to its initial position.

4. Apparatus for making tubes from sheet material comprising a mandrel, a plurality of rollers contacting with the mandrel at spaced points around its circumference, the mandrel being of greater length than the rollers, means for rotating the rollers, an arm in which the mandrel is rotatably mounted, a rod rigidly connected to the arm and arranged parallel to the mandrel, the rod being provided with a slot, a pivoted lever mounted in the slot, the rod being biased in one direction to retain the lever at one end of the slot, and cam means for moving the lever on its pivot to cause reciprocation of the rod and mandrel.

5. Apparatus for making tubes from sheet material comprising a mandrel, a plurality of rollers contacting the mandrel at spaced points around its circumference, the mandrel being of greater length than the rollers, means for rotating the rollers, an arm in which the mandrel is rotatably mounted, a rod rigidly connected to the arm and arranged parallel to the mandrel, the rod being provided with an elongated slot, a pivoted lever mounted in the slot, the rod being spring biased in one direction to cause the lever to engage one end of the slot, and means for moving the lever on its pivot to cause reciprocation of the rod and mandrel.

JOHN PARKER HILL.

REFERENCES CITED

The following references are of record in the file of this patent:

UNITED STATES PATENTS

| Number | Name | Date |
|---|---|---|
| 647,234 | Miller | Apr. 10, 1900 |
| 914,384 | Chesney | Mar. 9, 1909 |
| 1,090,369 | Wunderlich | Mar. 17, 1914 |
| 1,284,297 | Frederick | Nov. 12, 1918 |
| 1,646,479 | Frederick | Oct. 25, 1927 |
| 2,355,985 | MacFarland | Aug. 15, 1944 |
| 2,440,390 | Bogoslowsky | Apr. 27, 1948 |